(12) United States Patent
Khouw et al.

(10) Patent No.: US 7,756,105 B1
(45) Date of Patent: Jul. 13, 2010

(54) ON-HOOK SIGNAL DETECTOR

(75) Inventors: Stanley Khouw, Simi Valley, CA (US); Colin Whittaker, Santa Barbara, CA (US); Lop Ng, Westlake Village, CA (US)

(73) Assignee: Occam Networks, Santa Barbara, CA (US)

( * ) Notice: Subject to any disclaimer, the term of this patent is extended or adjusted under 35 U.S.C. 154(b) by 1252 days.

(21) Appl. No.: 10/377,065

(22) Filed: Feb. 28, 2003

(51) Int. Cl.
 *H04L 12/66* (2006.01)
(52) U.S. Cl. ............... 370/352; 379/88.02; 379/88.18; 379/88.21; 379/142.01; 379/210.01; 455/415; 709/227; 725/106
(58) Field of Classification Search ............ 455/574, 455/415; 370/352, 353–356; 379/142.02, 379/142.06, 142.17, 142.18, 88.02, 88.18, 379/88.21, 142.01, 210.01; 709/227; 725/106
See application file for complete search history.

(56) References Cited

U.S. PATENT DOCUMENTS

| | | | | |
|---|---|---|---|---|
| 5,737,400 | A * | 4/1998 | Bagchi et al. ............ | 379/142.01 |
| 5,884,194 | A * | 3/1999 | Shiraki ................ | 455/570 |
| 5,946,378 | A * | 8/1999 | Farfan ................ | 379/88.23 |
| 6,215,854 | B1 * | 4/2001 | Walance ................ | 379/21 |
| 6,590,965 | B1 * | 7/2003 | Poole et al. ............ | 379/88.19 |
| 6,614,781 | B1 * | 9/2003 | Elliott et al. ............ | 370/352 |
| 6,748,058 | B1 * | 6/2004 | Schwend et al. ......... | 379/88.21 |
| 6,788,924 | B1 * | 9/2004 | Knutson et al. .......... | 455/265 |
| 6,829,332 | B2 * | 12/2004 | Farris et al. ............ | 379/88.02 |
| 6,836,478 | B1 * | 12/2004 | Huang et al. ............ | 370/352 |
| 6,865,162 | B1 * | 3/2005 | Clemm ................ | 370/286 |
| 6,901,276 | B1 * | 5/2005 | Skinner et al. .......... | 455/574 |
| 6,928,154 | B1 * | 8/2005 | Cheaito et al. ......... | 379/207.15 |
| 6,952,469 | B2 * | 10/2005 | Han ................... | 379/142.17 |
| 6,970,543 | B2 * | 11/2005 | Lautenschlager et al. ................. | 379/142.04 |
| 7,076,554 | B1 * | 7/2006 | Kobayashi ............. | 709/227 |
| 7,333,798 | B2 * | 2/2008 | Hodge ................. | 455/411 |
| 7,349,532 | B2 * | 3/2008 | Henderson ............. | 379/142.04 |
| 7,391,857 | B2 * | 6/2008 | Beyda ................. | 379/210.01 |
| 7,536,178 | B2 * | 5/2009 | Paik et al. ............. | 455/415 |
| 7,602,890 | B2 * | 10/2009 | Luneau et al. .......... | 379/88.19 |
| 2004/0208300 | A1 * | 10/2004 | Choi .................. | 379/142.01 |
| 2004/0209605 | A1 * | 10/2004 | Urban et al. ........... | 455/415 |
| 2004/0242212 | A1 * | 12/2004 | Bacon et al. ........... | 455/415 |
| 2004/0261114 | A1 * | 12/2004 | Addington et al. ....... | 725/106 |
| 2005/0013415 | A1 * | 1/2005 | Atkinson et al. ........ | 379/21 |
| 2005/0031095 | A1 * | 2/2005 | Pietrowicz ............ | 379/88.18 |
| 2005/0152345 | A1 * | 7/2005 | Bog et al. ............. | 370/352 |
| 2007/0293205 | A1 * | 12/2007 | Henderson ............. | 455/415 |

(Continued)

OTHER PUBLICATIONS

R. Zopf, "RTP Payload for Comfort Noise," Internet Draft, pp. 1-7 (Mar. 2000).

(Continued)

*Primary Examiner*—Gerald Gauthier
(74) *Attorney, Agent, or Firm*—Blakely, Sokoloff, Taylor & Zafman LLP

(57) ABSTRACT

A method and apparatus are disclosed to minimize wasted bandwidth by suppressing communications between a trunking gateway and a media gateway until a telephone service-related signal is detected during an on-hook state. In an embodiment, the trunking gateway and the media gateway are part of a telecommunications network that utilizes a single fabric for both voice traffic and data traffic. For example, the network could transport all traffic via Internet Protocol packets.

17 Claims, 3 Drawing Sheets

U.S. PATENT DOCUMENTS

2008/0049628 A1* 2/2008 Bugenhagen ............... 370/244

OTHER PUBLICATIONS

International Telecommunication Union (ITU). ITU-T, G.711 General Aspects of Digital Transmission Systems: Terminal Equipments, Pulse Code Modulation (PCM) of Voice Frequencies (1993).

International Telecommunication Union (ITU). ITU-T, G.723.1 General Aspects of Digital Transmission Systems: Dual Rate Speech Coder For Multimedia Communications Transmitting at 5.3 and 6.3 kbit/s (Mar. 1996).

International Telecommunication Union (ITU). ITU-T, G.726 General Aspects of Digital Transmission Systems: Terminal Equipments, 40, 32, 24, 16 kbit/s Adaptive Differential Pulse Code Modulation (ADPCM)(Mar. 1996).

International Telecommunication Union (ITU). ITU-T, G.729. General Aspects of Digital Transmission Systems: Coding of Speech at 8kbit/s Using Conjugate-Structure Algebraic-Code-Excited Linear-Prediction (CS-ACELP) (Mar. 1996).

International Telecommunication Union (ITU). ITU-T, G.729, Annex B. Series G: Transmission Systems and Media; Digital Transmission Systems - Terminal equipments - Coding of Speech at 8kbit/s Using Conjugate Structure Algebraic-Code-Excited Linear-Prediction (CS-ACELP). Annex B: A silence compression scheme for G.729 optimized for terminals conforming to Recommendation V.70 (Nov. 1996).

International Telecommunication Union (ITU). ITU-T, I.112. Integrated Services Digtial Network (ISDN): General Structure: Vocabulary of Terms for ISDNs (Mar. 1993).

International Telecommunication Union (ITU). ITU-T, I.241.1. Integrated Services Digtial Network (ISDN): Service Capabilities: Teleservices Supported by an ISDN: Telephony (1993).

International Telecommunication Union (ITU). ITU-T, I.251.1 (Rev. 1). Integrated Services Digtial Network (ISDN): General Structure and Service Capabilities: Direct-Dialling-In (1992).

"Definition: Gateway," http://www.webopedia.com/TERM/gateway.html 1 pg. (Jan. 10, 2003).

"Definition: ISDN," http://www.webopedia.com/TERM/I/ISDN.html 1 pg. (Jan. 9, 2003).

* cited by examiner

ON-HOOK SIGNAL DETECTOR

FIELD

The embodiments disclosed herein relate generally to transmission of signals over a network, and more particularly to transmitting in-band signals during an on-hook state.

BACKGROUND

There are a variety of manners in which voice data (e.g., a telephone conversation) can be transmitted. For example, the data can be sent as either an analog or digital signal over a network. The analog signal, known as Plain Old Telephone Service ("POTS"), is carried over the Public Switched Telephone Network ("PSTN"). The digital signals used to carry voice data include, among others, Voice over Digital Subscriber Line ("VoDSL"), Channelized Voice over Digital Subscriber Line ("CVoDSL"), Voice over Internet Protocol ("VoIP"), and Point-to-Point Protocol ("PPP").

Regardless of the manner in which the voice data is transmitted, a voice data transmission channel can consume an unnecessarily large amount of network bandwidth in either an off-hook state or an on-hook state. An off-hook state is the state in which a transmission channel has been opened such that voice data can be sent from one party to at least one other party. An on-hook state is the state in which a first party cannot send voice data to another party without first opening a transmission channel to the other party or parties (e.g., moving to an off-hook state).

In an on-hook state, certain telephone service-related signals (e.g., a caller identification signal) must be sent over the network to a telephone even though no voice data is being sent. Some of these telephone service-related signals that are sent during the on-hook state are in-band signals (e.g., share the same transmission band as the voice data) while others are out-of-band signals (e.g., utilize a different transmission band than the voice data).

Out-of-band signals require networks that support different signaling bands for data traffic and voice traffic. In such a network, the out-of-band, on-hook signals are transmitted on the band for data traffic, and therefore, an open communications link for transmission of in-band signals during the on-hook state is not required.

However, a problem arises in networks that only have one communication fabric for both voice traffic and data traffic. For example, in-band, on-hook signals typically require an open communications link so that the signal can be sent without waiting for the communications link to be re-established. However, maintaining an open connection in this manner disadvantageously occupies network bandwidth even when no signals are being sent. This waste of bandwidth is undesirable, especially in a network that is capable of reallocating unused bandwidth among devices that are currently capable of transmitting voice or data traffic.

SUMMARY

Various embodiments described herein suppress communications between a first device (e.g., trunking gateway) and a second device (e.g., media gateway) until a telephone service-related signal is detected by the first device during an on-hook state. Examples of a telephone service-related signal include, among others, a caller identification signal, a visual message waiting indicator ON/OFF signal, and a B-channel transmission that conforms to the Integrated Services Digital Network standard.

Once the signal detector detects the energy of the signal, the suppression of communications is suspended, and the signal is transmitted to the second device. If the system is still in an on-hook state, suppression of communications is resumed.

In an embodiment, the first device and the second device are part of a telecommunications network that utilizes a single fabric for both voice traffic and data traffic. For example, the network could transport all traffic via Internet Protocol packets.

DESCRIPTION OF THE DRAWINGS

Various embodiments are illustrated by way of example and not by way of limitation in the figures of the accompanying drawings in which like references indicate similar elements. It should be noted that references to "an," "one," "the," "other," "alternative," or "various" embodiments in this disclosure are not necessarily to the same embodiment, and such references mean at least one.

DETAILED DESCRIPTION

In the following description, for the purposes of explanation, numerous specific details are set forth in order to provide a thorough understanding of the various embodiments. It will be apparent to one skilled in the art that the embodiments may be practiced without some of these specific details. In other instances, certain structures and devices are omitted or simplified in order to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
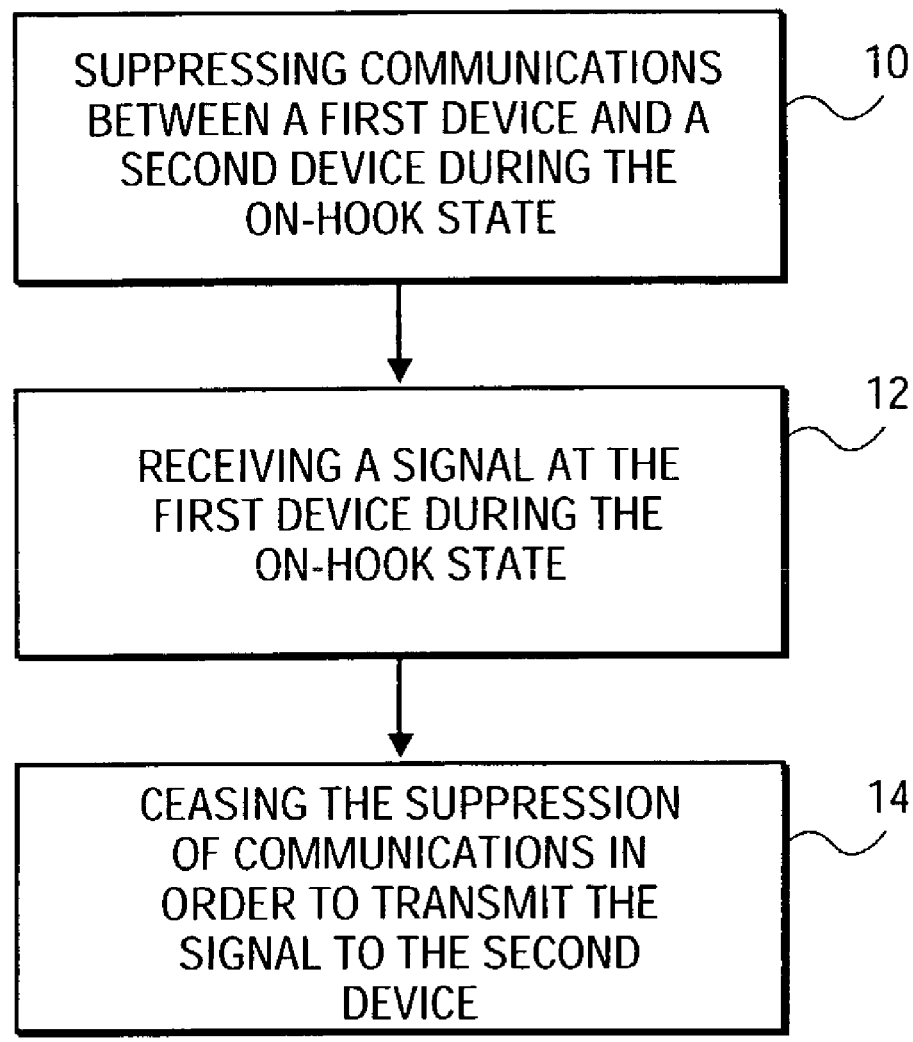
FIG. 1 is a flow chart of one method of suppressing communications between a first device and a second device during an on-hook state but permitting the transmission of certain signals from the first device to the second device.

Referring now to FIG. 1, a flow chart for one embodiment of a method of suppressing communications between a first device and a second device is shown. At block 10, communications between a first device and a second device are suppressed during an on-hook state. The first device could be a trunking gateway, which is a telephony device that enables communication between a local loop of a telecommunications network and a switch. The second device could be a media gateway, which is a telephony device at the transport layer that makes it possible to use standard telephones to talk over the Internet rather than multimedia computers. The media gateway also handles addressing problems (e.g., Internet Protocol address vs. phone number).

At block 12, a signal is received at the first device during the on-hook state. In various embodiments, the signal is received on a port of the first device from a switch. Circuitry capable of detecting signal energy (e.g., a voice activity detector) can be coupled to the port so that receiving the signal includes detection of the energy of the incoming signal (e.g., a telephone service-related signal). In an embodiment, the signal can be at least one of, for example, a caller identification signal, a visual message waiting indicator ("VMWI") ON signal, a VMWI OFF signal, and a B-channel transmission that conforms to, among others, the International Telecommunication Union's I.112-1993 et seq., I.241-1988 et seq., and I.251-1992 et seq. standards for an Integrated Services Digital Network.

At block 14, the suppression of communications between the first device and the second device is ceased so that the signal received at block 12 can be transmitted to the second device. If the system remains in an on-hook state after the signal is transmitted, suppression of communications is resumed.

In various embodiments, the first and second devices are coupled to a network that has a single communications fabric for transporting both voice and data traffic. If the communications fabric in such a network conforms to the Internet Protocol ("IP"), all voice traffic and data traffic is sent across the network in the form of IP packets. However, embodiments that utilize another communications fabric may require packets that conform to a different standard.

Figure 2:
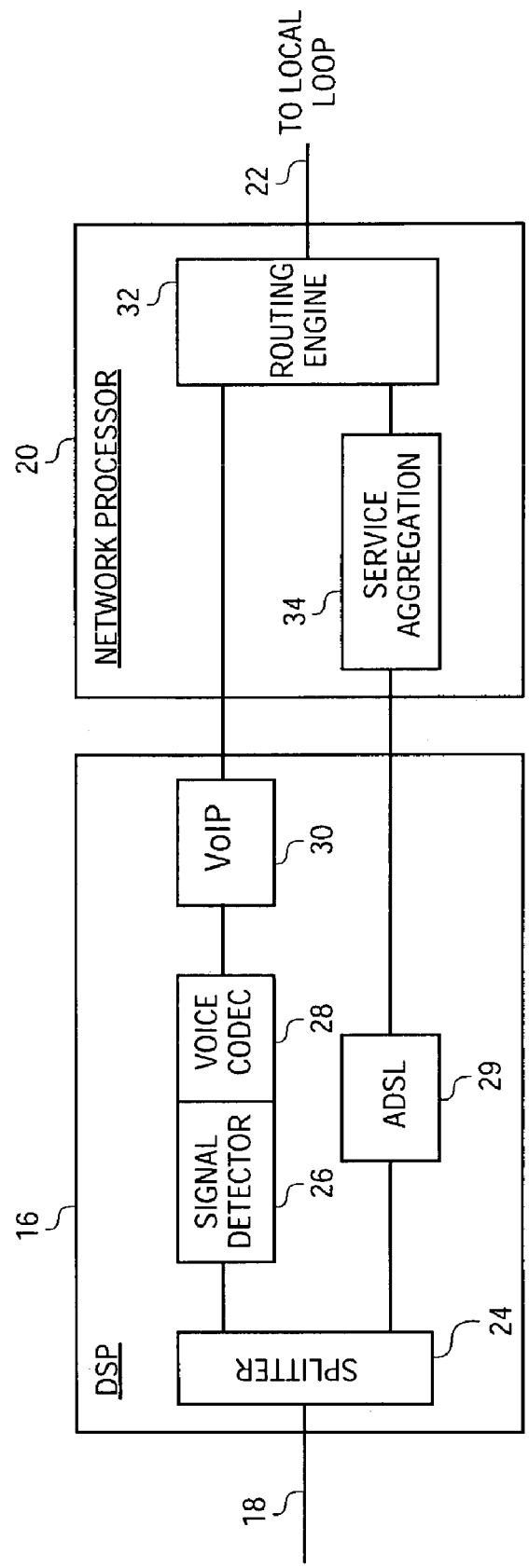
FIG. 2 is a diagram of one embodiment of a digital signal processor and a network processor that work together to permit transmission of certain signals in an on-hook state.

FIG. 2 shows a logical diagram of digital signal processor ("DSP") 16 and network processor 20, which contain circuitry to suppress communications between a trunking gateway and a media gateway, circuitry to suspend the suppression of communications, and circuitry to transmit the signal to the media gateway. DSP 16 has at least one input line 18. The input received from line 18 is directed through DSP 16 by frequency band splitter 24, which sends telephone service traffic that corresponds to a telephone service frequency band to signal detector 26.

Signal detector 26 is capable of detecting the energy of a signal (e.g., a telephone service-related signal) during an on-hook state of operation. Although shown as a separate component in FIG. 2, signal detector 26 may be incorporated within voice coder/decoder ("CODEC") 28, which digitizes the telephone service traffic. After being digitized, the telephone service data may be packetized in accordance with the IP protocol by conversion unit 30. The packets from conversion unit 30 are sent to routing engine 32 of network processor 20. Routing engine 32 of network processor 20 handles queuing, traffic management, scheduling, and switching the packetized data in order to send the packets to their respective network destinations via line 22, which is coupled to a backplane that is coupled to local loop 40 of FIG. 3.

Frequency band splitter 24 sends data traffic other than the telephone service traffic to modulator-demodulator (e.g., modem) 29 within DSP 16 to enable the data traffic to be sent over the local loop of a network. Modem 29 may be of any suitable type that will accommodate the type of service to be provided (e.g., Asymmetrical Digital Subscriber Line, "ADSL"). Data routed through modem 29 is reassembled from Asynchronous Transfer Mode ("ATM") cells into IP packets. Aggregation unit 34 of network processor 20 aggregates the IP packets and forwards them to routing engine 32, described above.

Although not shown in FIG. 2, a central processing unit ("CPU") may be coupled to routing engine 32 of network processor 20. The CPU can utilize an operating system to run applications and drivers. Among others, the applications can include a service creation application, a network management application, a security application, a content caching application, and a telephony control application.

Figure 3:
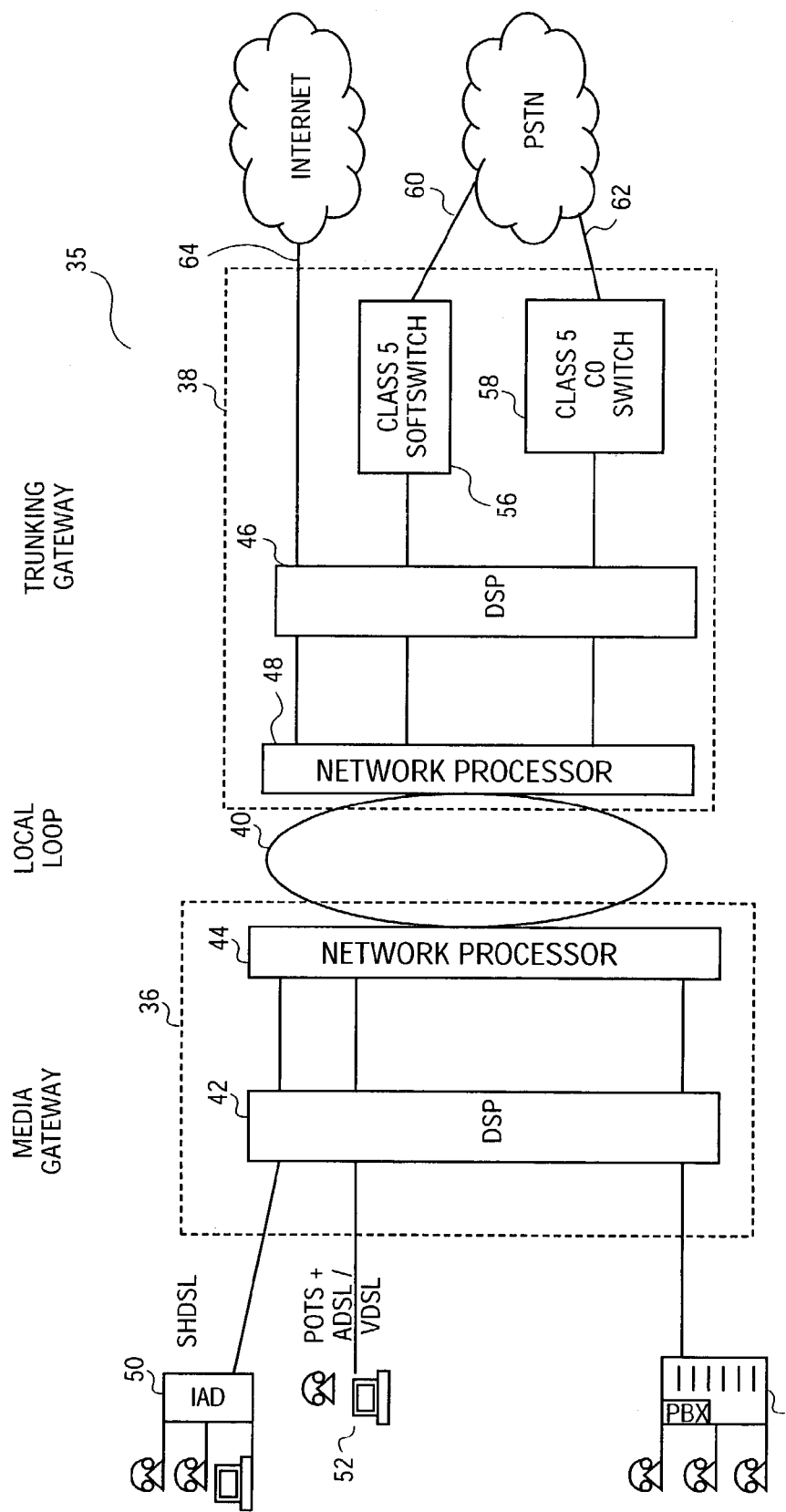
FIG. 3 is a diagram of one embodiment of a network that includes the digital signal processor and network processor of FIG. 2 to permit transmission of certain signals across the network in an on-hook state.

FIG. 3 shows a portion of telecommunications network 35 that carries telephone signals from trunking gateway 38 (also known as a Central Office) to subscribers connected to local loop 40. Digital signals are used as the transport mechanism over local loop 40. Local loop 40 is necessary since trunking gateway equipment has an operational range limitation of 18,000 feet. This range is called the trunking gateway service area. Subscribers living within that service area are the only subscribers who receive service directly from the trunking gateway. All other customers receive service from network 35 via media gateways coupled to local loop 40.

Media gateways act as service aggregation points for remote subscribers and are located along local loop 40, which is often comprised of fiber optic cable. However, other media can be used. For example, copper wire, coaxial cable, or a wireless connection can also be employed.

In operation, voice traffic bound for a subscriber during the off-hook state is digitized and formatted by DSP 46 and routed across local loop 40 by network processor 48 to media gateway 36, which services the target subscriber. Upon receipt of the digitized voice traffic, media gateway 36 converts the digitized signal into an analog signal that is carried to the target subscriber's telephone via a twisted pair of copper wires. In this manner, telephone service is provided to remote subscribers.

However, in an on-hook state, network processor 48 of trunking gateway 38 suppresses communications between trunking gateway 38 and media gateway 36 until a telephone service-related signal is received by DSP 46. In the embodiment shown, voice control device 56 (e.g., Class 5 softswitch) or switch 58 sends the signal to DSP 46, which includes circuitry capable of detecting signal energy (e.g., FIG. 2). Upon receipt of the signal by DSP 46, network processor 48 suspends the suppression of communications and transmits the signal over local loop 40 to media gateway 36, which routes and formats the signal for the appropriate destination device. Following are several examples of the devices and formats that can be used.

Media gateway 36 has a multiplexer (not shown) to terminate network subscriber connections. In various embodiments, a plurality of devices are coupled to the same multiplexer (e.g., interface). In addition, depending on the type of data received from the devices, the data may be combined and received on a single communication link (e.g., transport medium) and separated as necessary within media gateway 36.

For example, Integrated Access Device ("IAD") 50 provides SHDSL (e.g., Symmetrical High Bit Rate Digital Subscriber Line) service. IAD 50 is used to aggregate diverse traffic types such as voice and data from a subscriber over a single line. IAD 50 converts analog voice traffic to digital. The data traffic received from IAD 50 is routed to an xDSL interface of media gateway 36. As used herein, "xDSL" is a generic designator for all types of DSL (e.g., digital subscriber line) service.

Media gateway 36 may receive telephone service traffic that corresponds to a telephone service frequency band and ADSL/VDSL (e.g., Very High Bit Rate Digital Subscriber Line) traffic that corresponds to an xDSL frequency band from subscriber connection 52. Frequency band splitter 24 and ADSL modem 29 from FIG. 2 may also be included in DSP 42 to separate the telephone service traffic and the DSL traffic by frequency and packetize the data, as discussed above. The telephone service traffic is sent to VoIP conversion unit 30 of FIG. 2, which may also be included in DSP 42 of media gateway 36 of FIG. 3. Network processor 20 of FIG. 2 can be at least part of network processor 44 of FIG. 3.

Media gateway 36 may receive voice data from Public Branch Exchange ("PBX") 54. A PBX usually connects a large entity such as a corporation, hotel, or hospital to a phone network via a T1 connection. A T1 connection is a type of T-Carrier system, which uses TDM (e.g., Time Division Multiplexing) to combine and transmit Pulse Code Modulated streams created for each of many telephone conversations. DSP 42 transforms the voice data received in T1 format into VoIP packets that can be routed along with all the other IP packets via network processor 44 over local loop 40.

Upon receipt of the IP packets by network processor 48 of trunking gateway 38, the packets are routed to their appropriate destination by network processor 48. For example, packets bounds for the Internet are sent out of trunking gateway 38 via line 64.

If appropriate, the telephone service data may be routed from network processor 48 through voice control device 56 to a Public Switched Telephone Network ("PSTN") via line 60. In the embodiment shown in FIG. 3, voice control device 56 is a Class 5 softswitch, which is a specific type of voice control device. A voice control device includes software that resides on a server or other network element that separates call control functions of a phone call from the media gateways that carry the phone call. Built on open architectures, voice control devices are far less expensive than circuit switches and are much more flexible.

Alternatively, the telephone service data may be routed from network processor 48 through DSP 46, which removes the voice data from the VoIP packets and routes the voice data to switch 58. Switch 58 forwards the voice data to the PSTN via line 62. Although not shown, DSP 46 can include either TR-08 or GR-303, both of which are interfaces between a local loop and a switch (e.g., Class 5 Central Office Switch).

As described above, suppressing communications between the trunking gateway and media gateway during an on-hook state until the energy of a telephone service-related signal is detected eliminates the need to maintain an open communications link at all times. Such a communications link wastes a significant amount of bandwidth since no meaningful data is being sent during the majority of time that the communications link is being held open. By only permitting transmission when necessary, bandwidth that would otherwise be consumed can be reallocated to other devices on the network.

It is to be understood that even though numerous characteristics and advantages of various embodiments have been set forth in the foregoing description, together with details of structure and function of the various embodiments, this disclosure is illustrative only. Changes may be made in detail, especially matters of structure and management of parts, without departing from the scope of the various embodiments as expressed by the broad general meaning of the terms of the appended claims.

We claim:

1. An apparatus comprising:
   circuitry that suppresses communications over an established communications link between the apparatus, wherein the apparatus is a trunking gateway, and a second device coupled to a network during a first state of operation, wherein the first state of operation comprises an on-hook state when the established communications link exists between the apparatus and the second device;
   a port to receive a telephone service-related signal during the first state of operation, wherein the telephone service-related signal that is other than a voice signal includes a caller identification signal; and
   circuitry to suspend the suppression of communications over the communications link in response to receiving the telephone service-related signal that is other than the voice signal and to transmit the telephone service-related signal to the second device.

2. The apparatus of claim 1, wherein the circuitry to suppress communications comprises:
   circuitry to detect signal energy.

3. The apparatus of claim 2, wherein the circuitry to detect signal energy comprises:
   a voice activity detector.

4. The apparatus of claim 2, wherein the telephone service-related signal comprises:
   at least one of
   a visual message waiting indicator on signal,
   a visual message waiting indicator off signal, and
   a B-channel transmission that conforms to an Integrated Services Digital Network standard.

5. The apparatus of claim 1, wherein the network, in operation, transmits data in a packet format.

6. The apparatus of claim 5, wherein the packet format conforms to an Internet Protocol.

7. The apparatus of claim 1, wherein the second device comprises:
   a media gateway.

8. A network comprising:
   a media gateway; and
   a trunking gateway coupled to the media gateway, the trunking gateway comprising
   circuitry that suppresses communications over an established communications link between the trunking gateway and the media gateway during a first state of operation, wherein the first state of operation comprises an on-hook state when the established communications link exists between the trunking gateway and the media gateway;
   a port to receive a telephone service-related signal during the first state of operation, wherein the telephone service-related signal that is other than a voice signal includes a caller identification signal, and
   circuitry to suspend the suppression of communications over the communications link in response to receiving the telephone service-related signal that is other than the voice signal and to transmit the telephone service-related signal to the media gateway.

9. The network of claim 8, wherein the circuitry to suppress communications comprises:
   circuitry to detect signal energy.

10. The network of claim 9, wherein the circuitry to detect signal energy comprises:
    a voice activity detector.

11. The network of claim 9, wherein the telephone service-related signal comprises:
    at least one of a visual message waiting indicator on signal, a visual message waiting indicator off signal, and a B-channel transmission that conforms to an Integrated Services Digital Network standard.

12. The network of claim 8, wherein the network, in operation, transmits data in a packet format.

13. The network of claim 12, wherein the packet format conforms to an Internet Protocol.

14. A method comprising:
    suppressing communications over an established communications link between a first device, wherein the first device is a trunking gateway and a second device during a first state of operation, wherein the first state of operation comprises an on-hook state when the established communications link exists between the first device and the second device, and wherein the first device and the second device are coupled to a network;

receiving a telephone service-related signal at the first device during the first state of operation, wherein the telephone service-related signal that is other than a voice signal includes a caller identification signal;

ceasing the suppression of communications over the communications link in response to receiving the telephone service-related signal that is other than the voice signal; and transmitting the signal to the second device.

15. The method of claim 14, further comprising:
after transmitting, resuming suppression of communications.

16. The method of claim 14, wherein receiving comprises: detecting energy of the signal.

17. The method of claim 14, wherein transmitting comprises:
propagating at least one packet across the network.

\* \* \* \* \*